United States Patent [19]

Tegtmeier

[11] Patent Number: 4,573,742

[45] Date of Patent: Mar. 4, 1986

[54] HYDRAULIC STABILIZING MECHANISM FOR USE WITH HYDRAULIC ELEVATING SYSTEM

[75] Inventor: Sheldon D. Tegtmeier, West Fargo, N. Dak.

[73] Assignee: Tegtmeier & Sons, Inc., West Fargo, N. Dak.

[21] Appl. No.: 549,275

[22] Filed: Nov. 7, 1983

[51] Int. Cl.⁴ .............................................. B65G 67/32
[52] U.S. Cl. .................................. 298/11; 298/17 S; 298/18; 180/41; 81/517
[58] Field of Search ............... 298/17 S, 10, 11, 22 C, 298/18; 180/41; 251/63.5, 63.6; 91/517, 518, 433

[56] References Cited

U.S. PATENT DOCUMENTS

| | | | |
|---|---|---|---|
| 3,712,675 | 1/1973 | Schoenwald | 298/10 |
| 4,179,981 | 12/1979 | Yeou | 91/518 X |
| 4,349,305 | 9/1982 | Wynn et al. | 91/517 X |

*Primary Examiner*—H. Grant Skaggs
*Assistant Examiner*—Nils E. Pedersen
*Attorney, Agent, or Firm*—John W. Adams

[57] ABSTRACT

A hydraulic stabilizing mechanism for connection with a main hydraulic hoist system for automatically actuating at least a pair of stabilizing cylinders to extend the same into statilizing position whenever the main hoist system is extended and positively prevent the stabilizing cylinders from retracting until the main hoist system is in fully retracted position, and more specifically, a hydraulic stabilizing mechanism for farm wagon dump boxes which provides hydraulically actuated stabilizing strut elements between the wagon bolster and the front axle which are maintained in extended stabilizing position whenever the hydraulic box dumping mechanism is extended.

4 Claims, 8 Drawing Figures

HYDRAULIC STABILIZING MECHANISM FOR USE WITH HYDRAULIC ELEVATING SYSTEM

BACKGROUND OF THE INVENTION

There are many hydraulically actuated elevating mechanisms such as farm wagon dump boxes, hydraulically operated back hoes, mobile crane units, and the like, which require positive stabilizers for maximum stability during operation of the principal hydraulic apparatus. In the case of farm wagon dump boxes, it is important for the safe operation thereof to provide for a rigid stabilizing strut unit between the wagon bolster and the front turning axle of the wagon. A hydraulic cylinder system elevates the wagon box and dumps the same, and, in the past, mechanical stabilizers have been provided, such as are shown in Gerald W. Bishop U.S. Pat. No. 3,995,894 assigned to GilmoreTatge Manufacturing Co. of Clay Center, Kans. It is important with such wagon units that during the wagon elevating and dumping operation, the wagon frame or bolster assembly be rigidly supported on the steering axle of the wagon to provide the wagon frame with four-point stabilized support. This is particularly critical when the wagon unit is being operated on uneven ground where one of the steering wheels is at a different elevation from the other wheel and it is desired to maintain the wagon rigidly stabilized on both sides of the front axle.

SUMMARY OF THE INVENTION

The present invention provides a pair of double acting stabilizing cylinders responsive for extension to the elevating operation of a main hydraulic hoisting system and includes a control mechanism for maintaining the extension of the stabilizing cylinders until after the main hydraulic hoisting system has been returned to fully retracted position. The invention disclosed herein relates to a farm wagon dump box unit having a main hydraulic system for elevating and dumping the box and includes a pair of automatically-actuated, stabilizing, hydraulically-actuated cylinders connected to the main system and, when in extended position, operate as rigid stabilizing struts extending between the front wagon bolster or frame and the front axle whenever the main hydraulic hoist system is in extended operating position.

More specifically, the disclosure includes a single hydraulic fluid control and distribution block with connecting ports and passages therein which provide a simplified connection of the stabilizing system to the main hydraulic hoist system of a farm dump wagon box.

Figure 6:
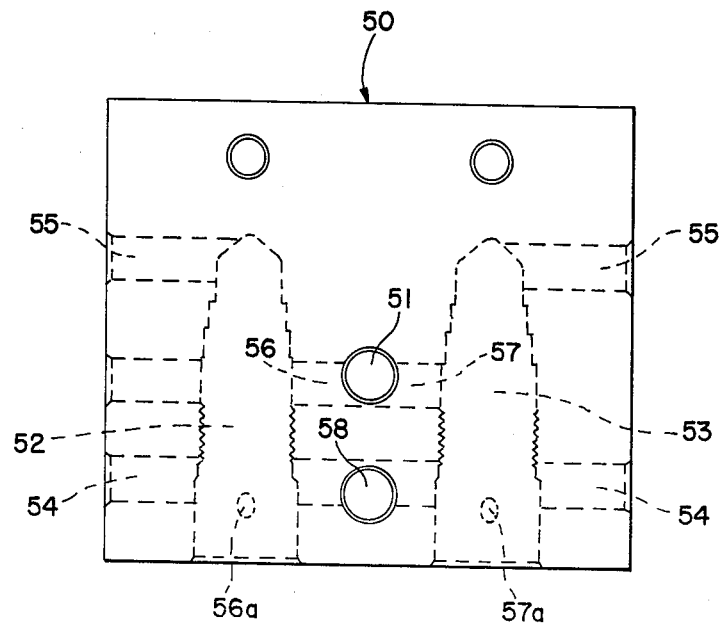
Figure 7:
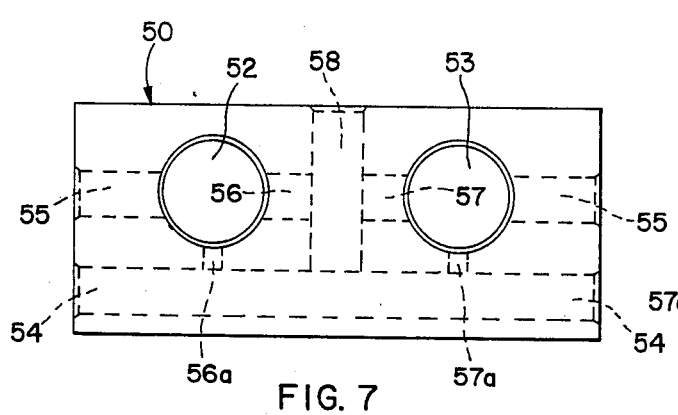

FI. 5 is a front elevational view of the valve mounting and distribution block;

FIG. 6 is a top plan view thereof;

FIG. 7 is an end elevational view thereof; and

Figure 8:
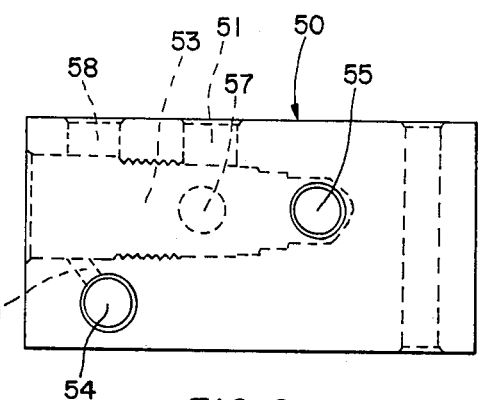

FIG. 8 is a side elevational view thereof.

DETAILED DESCRIPTION OF THE ILLUSTRATED EMBODIMENT

A wagon dump box unit is illustrated which has a conventional, generally rectangular wagon frame or bed 2 provided with a rear axle 6 with a pair of rear wheels 8 journaled thereon and a front axle 10 extending below the front portion of the frame 2 with a pair of front wheels 12 journaled on the ends of the front axle 10 and are pivotable on vertical axes for steering the wagon. A horizontal longitudinal pivot 14 connects the front axle and the front of the wagon frame 2 and provides for lateral tilting of the front axle 10 with respect to the frame 2 as the wagon travels over uneven terrain. A tow bar 18 is connected to the front axle 10 and a pair of tie rods 19 provide a steering connection with the front wheels 12. The specific steering mechanism is of conventional design and is not pertinent to the present invention. The rear axle 6 is rigidly mounted to the rear portion of the frame 2.

A dump box 20 has one side of its upper edge pivotally mounted to three extensible strut elements 22 which are telescopically received within hollow stationary support elements 24 which are rigidly mounted on the wagon frame 2 as shown. The stationary strut elements are supported in the desired sloping relation by a rigid frame structure 26 supported on the wagon frame 2.

Figure 1:
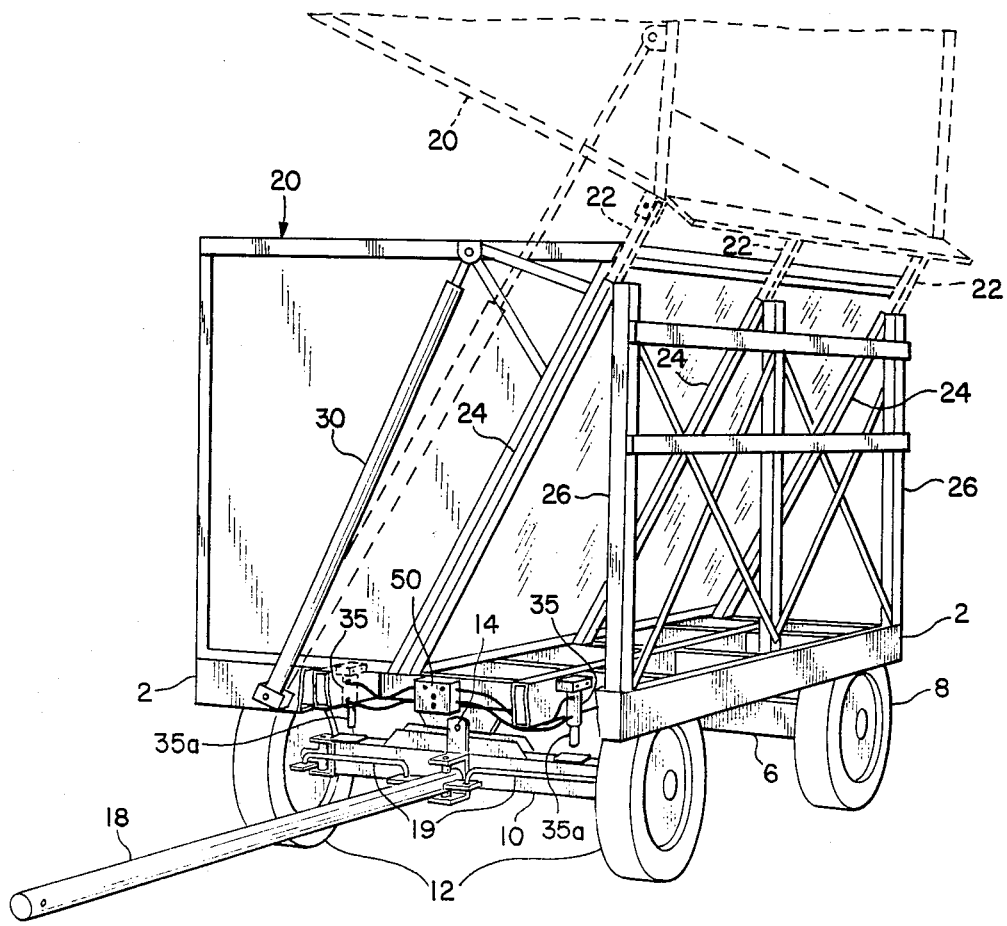
FIG. 1 is a perspective view of a farm wagon dump box unit embodying the invention and showing the box in lowered position by full lines and in elevated dumping position by dotted lines.

A pair of main hydraulic cylinders 30 are provided for not only extending the struts 22 but also for dumping the wagon box 20 as shown by the dotted line position in FIG. 1. This dumping mechanism is described in U.S. Pat. No. 3,844,617 assigned to the said assignee of the present application.

Figure 2:
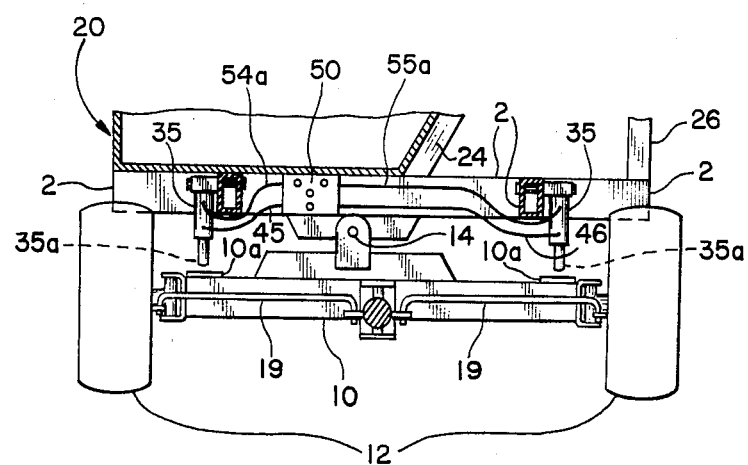
FIG. 2 is a front elevational view of the wagon unit shown in FIG. 1.

A pair of stabilizing cylinders 35 are fixed on the front portion of the wagon frame 2 and each cylinder has a downwardly extensible stabilizing element 35a which is aligned with a pad 10a provided on the top of each end of the front axle 10 as best shown in FIG. 2. The cylinders 35 and extensible stabilizing elements 35a provide a positive rigid strut connection between the sides of the front portion of the wagon box frame 2 and the outer end portions of the front axle 10, and are designed to connect the frame 2 front axle 10, and prevent any pivotal action from occurring about the horizontal axle pivot 14 during the box elevating and dumping operation. These stabilizing cylinders 35 serve the same function as the mechanical pawl elements 60 shown in U.S. Pat. No. 3,995,894. The hydraulic system to be described in detail herein is specifically designed to actuate these stabilizing cylinders 35 as soon as the main hoisting cylinders 30 are actuated to begin the box-elevating operation, and the cylinders 35 are connected in parallel to permit the two stabilizing rods or elements 35a to be extended simultaneously and to be extended by different increments if the front wheels are on uneven ground so that a positive strut support is provided between each side of the wagon frame 2 and the front axle 10 on uneven ground conditions, as well as on level ground.

DESCRIPTION OF HYDRAULIC SYSTEM

The hydraulic system includes a pump 36 drawing hydraulic fluid from a reservoir 37 and delivering fluid under pressure to a directional valve 38 having a control handle 38a which controls the direction of fluid from the pump into the system and permits reversing of the system in a conventional manner. A relief valve 39 provides a maximum pressure limit in the system. During the extending cycle, fluid from the pump is directed to extension supply conduit 40 which delivers to main hydraulic cylinder 30 forcing fluid from the top of cylinder 30 through connection conduit 42 into the bottom of equalized displacement cylinder 31 in series with cylinder 30 as shown and back through valve 38 to reservoir 37. Extension supply conduit 40 is connected to the distribution block 50 at supply inlet 51. A pair of compensating check valves 60 such as valve model CBGA manufactured by the Sun Hydraulics Corporation of Sarasota, Fla., are mounted in the block 50 for controlling the back flow of liquid from the cylinders 35. The fluid during the cylinder extension cycle flows freely through the check valves 60 mounted in the block 50 and through passages 50a provided in the block, and through extension supply conduits 54a and 55a into the top of the respective cylinders 35. Fluid is ejected from the bottom of cylinders 35 and is returned to the block 50 through conduits 45 and 46 and is delivered to the block through ports 56 and 57 and passages 56a and 57a and out through outlet 58 in the block and back to the pump reservoir through conduit 44a.

The piston rods 35a are immediately projected downwardly into engagement with pads 10a provided on the top of the outer end portions of axle 10 to provide a positive strut connection between the wagon frame 2 and the axle and thus, produce a stabilized supporting structure for the box during the elevating and dumping operation. The dotted position in FIG. 3 of the axle depicts a possible tilting angle around the pivot 14 to illustrate different projection increments where the axle 10 is on uneven ground. The valves 60 maintain the piston rods 35a in projected, stabilizing position during extension of the main cylinders 30 and 31.

The reversing of the main cylinders 30 and 31 is accomplished in the conventional way by reversing the flow from the pump and supplying fluid through the conduit 44 to lower the main cylinders 31 and 30, the fluid being ejected from conduit 40 and back to the reservoir in the conventional reversing fluid flow system. The stabilizing cylinders 35 are maintained in extended position by the counterbalancing check valves 60 during the lowering of the main cylinders 30 and 31. The fluid supplied from the pump through conduit 44 applies reversing pressure through conduit 44a; however, the construction of the check valves 60 prevents the cylinders 35 from being lowered until the main cylinders 30 and 31 return to their fully retracted position. When this occurs, the pressure from the pump will increase to the potential maximum permitted by relief valve 39 and when this pressure is imposed upon the two counterbalancing check valves 60 through line 44a, this maximum pressure is sufficient to overcome the retaining pressure being maintained by the valves 60 and will open the valves and release fluid from the upper side of each of the stabilizing cylinders 35 to retract the cylinder rods 35a.

DESCRIPTION OF THE COUNTERBALANCING VALVES

Each valve unit 60 has a main outer body or casing 61 having three separation lands with seals 62, 63 and 64. The casing 61 is hollow and has a first valve element 67 slidably mounted therein. The valve 67 is normally held in closed position by a light compression spring 68 interposed between shoulder 67a of the valve 67 and a core element 74 to be described herein. A heavy compression spring 72 normally holds a second valve element 70 with ports 70a, in projected, closed position within the casing 61 with the shoulder 70b of the valve 70 engaged with an interior shoulder 61a of the casing 61. The counterbalancing tension in the spring 72 is adjustable by means of an annular spring seat member 73 having internal threads which mesh with external threads 74a of a rotatable core member 74 which has an allen wrench socket 74b in the outer end thereof.

Each of the exterior circumferential separations seals 62, 63 and 64 isolates the respective annular areas surrounding the valve casing 61 surrounded by the respective stepped areas of valve cavities 52 and 53. The area between circumferential seals 62 and 63 forms an annular releasing pilot area 65 having a releasing port 65a extending through the adjacent casing portion 61 and communicating with an annular control passage area 66 formed around the valve element 70.

Supply or extension fluid flows inwardly from conduit 40a through the valve 60 by entering through inlet port 51, ports 75 and ports 70a and through the annular passage 76 formed around the inner end of first valve element 67. The light spring 68 compresses to permit the valve element 67 to move away from the inner end 70c of the second valve element 70 and permit substantially free flow of the fluid to the cylinders 35. When the fluid seeks to return through annular passage 76, the seal between the annular surface 67b of first valve element 67 and the inner end 70c of the second valve 70 prevents the return flow from cylinders 35. The check valve function of first valve element 67 and the inner end 70c of second valve 70 can only be released by moving the second valve element 70 axially outwardly away from the retracted first valve element 67, thus permitting return flow of the fluid back through passage 76 and ports 70a and 75. The retraction of the second valve element 70 is accomplished when sufficient pressure is supplied to the pilot area 65 and from there, through port 65a to exert pressure against the control passage area 66 formed around the inner end of the stop shoulder 70b to force the control valve 70 outwardly against the force of spring 72 and thus, retract the sealing edge 70c of the sleeve from contact with the retracted first valve element 67.

Figure 3:
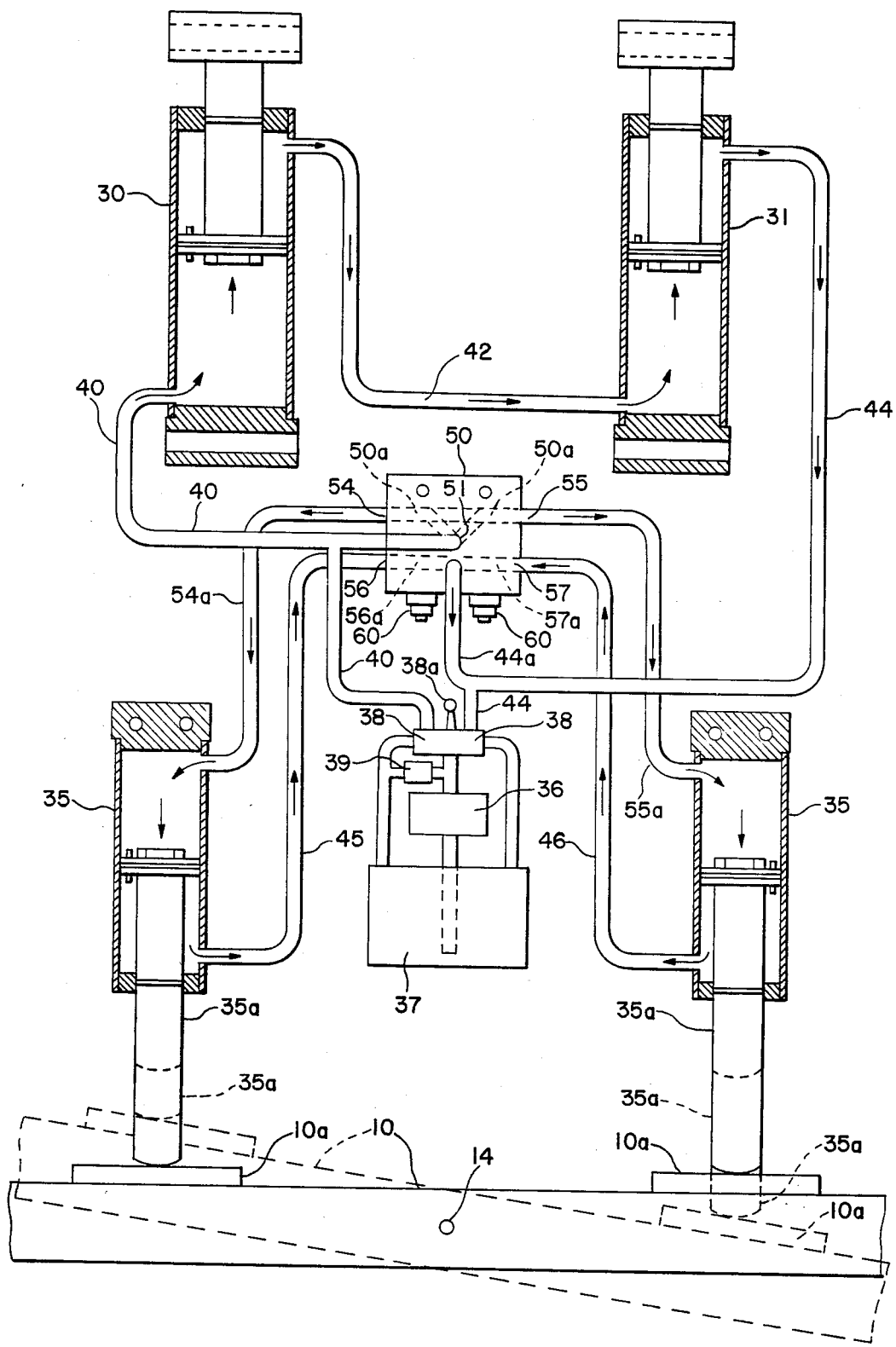
FIG. 3 is a diagrammatic view of the hydraulic system showing both the main cylinders and the stabilizing cylinders in intermediate position.
Figure 4:
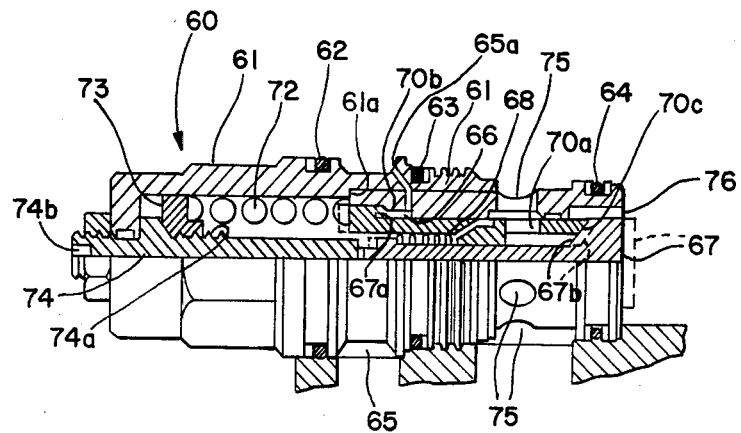
FIG. 4 is a sectional view of a typical valve construction.
Figure 5:
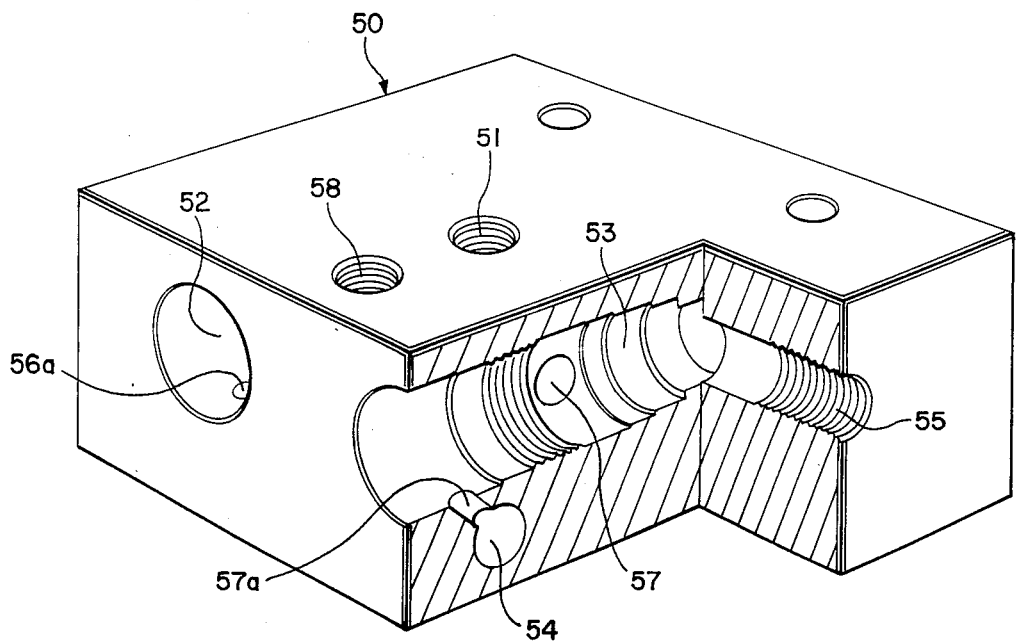

Each valve 60 must be opened by separating the two closure surfaces 67a and 70c. When the stabilizing rods 35a are being extended into their stabilizing seated position against the axle 10, the fluid flowing in through ports 75 shifts the first valve element 67 inwardly away from its mating surface 70c to permit free inflow to the cylinders 35 through the ports 76 and conduits 45 and 46. The back pressure in the lines 54a and 55a when the rods 35a have been extended to engage the axle pads 10a as shown in FIG. 3, will cause the first valve elements 67 to seat in check valve sealed position against the mating surface 70c of the control sleeve 70. Release of the check valve action then can only be accomplished by applying sufficient pilot valve pressure into the annular passage 65 and port 61a which communicates with the annular control area 66 which, in turn, applies fluid pressure to the inner surface of the shoulder 70b. When this pressure is sufficient to overcome the force of counterbalancing spring 72, the control sleeve 70 is retracted from the first valve element 67 and return flow is permitted through the passage 76 and out through the ports 75 as previously described. Conventional tractor hydraulic pumps have a maximum output pressure in excess of the normal operating pressure required to accomplish the main operating function. In the present mechanism the normal operating pressure is approximately 600 psi for elevating and dumping the wagon box unit and somewhat less than that for returning it to normal retracted position. However, when the pistons in cylinders 30 and 31 are fully retracted, this pressure builds up to more than three times the normal operating pressure and when this pressure reaches the release setting of the valves 60, fluid is permitted to return through the conduits 54a and 55a through the valves 60 and conduit 40a during the return cycle. It is necessary that each stabilizing cylinder 35 has its own individual check valve 60 in order to maintain the pressure in the individual extension cylinders and permit different incremental extensions of the cylinders to be maintained by preventing fluid from flowing from one stabilizing cylinder directly to the other when the same are in extended position.

It will be seen from the foregoing description that this invention provides an automatically actuated hydraulic stabilizing cylinder system which incorporates a single distribution block unit in which counterbalance valves are mounted to maintain the stabilizing cylinders in individually extended stabilizing position as long as the main hydraulic cylinders are raised above their fully retracted position. The fluid delivered to the stabilizing cylinders 35 provides substantially instantaneous projection on the stabilizing rods 35a into stabilizing contact with the pads 10a on the axle 10 as soon as elevating pressure is applied to the system. This response occurs regardless of whether or not the axle is level or is tilted due to the front wheels of the wagon resting on an uneven ground surface.

It will, of course, be understood that various changes may be made in the form, detail and proportion of the parts without departing from the scope of this invention which, generally stated, consists in the matter set forth in the appended claims.

What is claimed is:

1. A stabilizing hydraulic system for use in a farm wagon box dumping mechanism in conjunction with a main hydraulic box dumping system of the type having at least a pair of main hydraulic dumping cylinders responsive for actuation in two directions to a valve-controlled hydraulic pump and reservoir system which produces a normal operating pressure during extension and retraction of the main hydraulic cylinders, but which produces substantially increased pressure after the main dumping cylinders reach fully retracted position, said stabilizing system comprising,
   a wheeled wagon,
   a dump box pivotally mounted on one side thereof and including a rigid frame mounted on said wheels with a front axle underlying the front of said frame and mounted for transverse pivotal action substantially on the longitudinal center line of said frame,
   a pair of hydraulic stabilizing cylinders interposed between the end portions of the axle and the overlying front portions of said frame, each cylinder having an extensible piston rod working therein and respectively interposed between the frame of the wagon and the outer underlying portions of the front axle whereby the piston rods when extended, will provide a pair of rigid compression struts between the frame and the underlying portions of the front axle for stabilizing the wagon during the dumping operation of the box,
   a hydraulic pump supplying fluid under pressure to the main dumping cylinder and the stabilizing cylinders,
   hydraulic fluid conduits carrying fluid to and from said pump and said main hydraulic cylinders and said hydraulic stabilizing cylinders,
   a control valve connected to said conduits for controlling the direction of flow from said pump to said main cylinders and said stabilizing cylinders,
   a pair of releaseable stabilizing check valve elements respectively interposed in the supply conduits to said hydraulic stabilizing cylinders with means for holding the same in closed position during normal retracting pressures in said hydraulic system but individually and separately responsive for release to increased pressures produced by said pump when the main cylinder has been returned to fully retracted position to permit the stabilizing cylinders to be individually and separately extended and retracted.

2. The structure set forth in claim 1 and pilot passage means affording communicating between the flow conduits to the stabilizing cylinders and means defining a release control chamber and a pilot passage affording communicating between the flow conduits and the chamber to cause release of the respective stabilizing check valve elements only when the pressure in the system increases above a predetermined limit.

3. The structure set forth in claim 1 and a control block mounted on the wagon and having a plurality of flow control passages selectively connected with the conduits to the stabilizing cylinders, said check valves being mounted in said control block to control the flow to and from said stabilizing cylinders.

4. A stabilizing hydraulic system for use in a farm wagon box dumping mechanism in conjunction with a main hydraulic box dumping system of the type having at least one main hydraulic dumping cylinder responsive for actuation in two directions to a valve-controlled hydraulic pump and reservoir system which produces a normal operating pressure during extension and retraction of the main hydraulic cylinder but which produces substantially increased pressure after the main dumping cylinder reaches its fully retracted position, said stabilizing system comprising,
   a wheeled wagon,
   a dump box pivotally mounted on one side thereof and including a rigid frame mounted on said wheels with a front axle underlying said frame and mounted for transverse pivotal action substantially on the longitudinal center line of said frame,
   a pair of hydraulic stabilizing cylinders, each having an extensible piston rod working therein and interposed between the frame of the wagon and the front axle whereby the piston rods when extended, will engage the axle to provide a pair of rigid compression struts between the frame and the wheeled axle for stabilizing the wagon during the dumping operation of the box,
   a hydraulic pump supplying fluid under pressure to the main dumping cylinder and the stabilizing cylinders,
   hydraulic fluid conduits carrying fluid to and from said pump and said main hydraulic cylinder and said hydraulic stabilizing cylinders,
   a control valve connected to said conduits for controlling the direction of flow from said pump to said main cylinder and said stabilizing cylinders, releasable check valve elements in the supply conduits to said hydraulic stabilizing cylinders with means for holding the same in closed position during normal retracting pressures in said hydraulic system but responsive for release to increased pressures produced by said pump when the main cylinder has been returned to fully retracted position to permit the stabilizing cylinders to be retracted, a control block mounted on the wagon and having a plurality of flow control passages selectively connected with the conduits to the stabilizing cylinders, said check valves being mounted in said control block to control the flow to and from said stabilizing cylinders, and said control block including a release control chamber with a pilot passage affording communicating between the flow conduits and the chamber to cause release of each valve only when the pressure in the system increases above a predetermined limit.

* * * * *